(12) United States Patent
Kwon et al.

(10) Patent No.: US 9,741,974 B2
(45) Date of Patent: Aug. 22, 2017

(54) BATTERY CELL HAVING ROUND CORNER

(71) Applicant: LG CHEM, LTD., Seoul (KR)

(72) Inventors: Sungjin Kwon, Daejeon (KR); Young Hoon Kim, Daejeon (KR); Sunghan Yoon, Daejeon (KR); Dong-Myung Kim, Daejeon (KR); Ki Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/653,054

(22) PCT Filed: Apr. 8, 2014

(86) PCT No.: PCT/KR2014/003028
§ 371 (c)(1),
(2) Date: Jun. 17, 2015

(87) PCT Pub. No.: WO2014/168397
PCT Pub. Date: Oct. 16, 2014

(65) Prior Publication Data
US 2016/0020434 A1   Jan. 21, 2016

(30) Foreign Application Priority Data

Apr. 11, 2013  (KR) .................. 10-2013-0039743

(51) Int. Cl.
*H01M 2/04*  (2006.01)
*H01M 2/02*  (2006.01)

(52) U.S. Cl.
CPC .......... *H01M 2/021* (2013.01); *H01M 2/024* (2013.01); *H01M 2/0212* (2013.01);
(Continued)

(58) Field of Classification Search
CPC .......... H01M 2220/10; H01M 2220/20; H01M 2220/30; H01M 2/021; H01M 2/0212;
(Continued)

(56) References Cited

U.S. PATENT DOCUMENTS

2004/0048149 A1\* 3/2004 Gross .................. H01M 2/0267
                                                                 429/127
2005/0191549 A1   9/2005 Kang et al.
(Continued)

FOREIGN PATENT DOCUMENTS

CN          100447334         12/2008
EP          2 958 177 A1      12/2015
(Continued)

OTHER PUBLICATIONS

International Search Report issued in PCT/KR2014/003028, mailed on Jul. 17, 2014.
(Continued)

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

Disclosed herein is a battery cell configured to have a structure in which an electrode assembly, including positive electrodes, negative electrodes, and separators disposed respectively between the positive electrodes and the negative electrodes, is mounted in a battery case made of a laminate sheet including a resin layer and a metal layer, wherein the battery case is made of a one-unit member, which is bent to form an upper case and a lower case, at least one of the upper and lower cases is provided with a receiving part, in which the electrode assembly is mounted, the receiving part having a round corner formed at at least one side edge thereof, and sealed portions, which are formed at
(Continued)

the upper case and the lower case by thermal welding, are located at an upper side of the battery case at which at least one electrode terminal is located, a first lateral side of the battery case adjacent to the upper side, and a lower side of the battery case opposite to the upper side, and a second lateral side of the battery case adjacent to the upper side is formed by a bent structure of the battery case.

19 Claims, 8 Drawing Sheets

(52) U.S. Cl.
CPC ....... *H01M 2/0277* (2013.01); *H01M 2/0285* (2013.01); *H01M 2/0287* (2013.01); *H01M 2220/10* (2013.01); *H01M 2220/20* (2013.01); *H01M 2220/30* (2013.01)

(58) Field of Classification Search
CPC .. H01M 2/024; H01M 2/0277; H01M 2/0285; H01M 2/0287
See application file for complete search history.

(56) References Cited

U.S. PATENT DOCUMENTS

| | | |
|---|---|---|
| 2011/0287308 A1 | 11/2011 | Kim et al. |
| 2012/0015236 A1 | 1/2012 | Spare |
| 2012/0225345 A1 | 9/2012 | Kim |
| 2013/0011721 A1 | 1/2013 | Kim et al. |
| 2013/0052510 A1 | 2/2013 | Miyazaki et al. |
| 2013/0108906 A1* | 5/2013 | Bhardwaj ......... H01M 10/0431 429/94 |

FOREIGN PATENT DOCUMENTS

| | | |
|---|---|---|
| JP | 2000-149994 A | 5/2000 |
| JP | 2001-199413 A | 7/2001 |
| JP | 2001-202931 A | 7/2001 |
| JP | 2002-15713 A | 1/2002 |
| JP | 2006-114406 A | 4/2006 |
| JP | 2012-185938 A | 9/2012 |
| JP | 2013-48054 A | 3/2013 |
| KR | 2003-0066960 A | 8/2003 |
| KR | 10-2007-0099068 A | 10/2007 |
| KR | 10-2007-0105115 A | 10/2007 |
| KR | 10-2008-005869 A | 6/2008 |
| KR | 10-1029837 B1 | 4/2011 |
| KR | 10-2011-0112241 A | 10/2011 |

OTHER PUBLICATIONS

Extended European Search Report, issued May 17, 2016, for European Application No. 14782417.1.

European Office Action, issued Feb. 6, 2017, for European Application No. 14 782 417.1.

* cited by examiner

[FIG. 1]
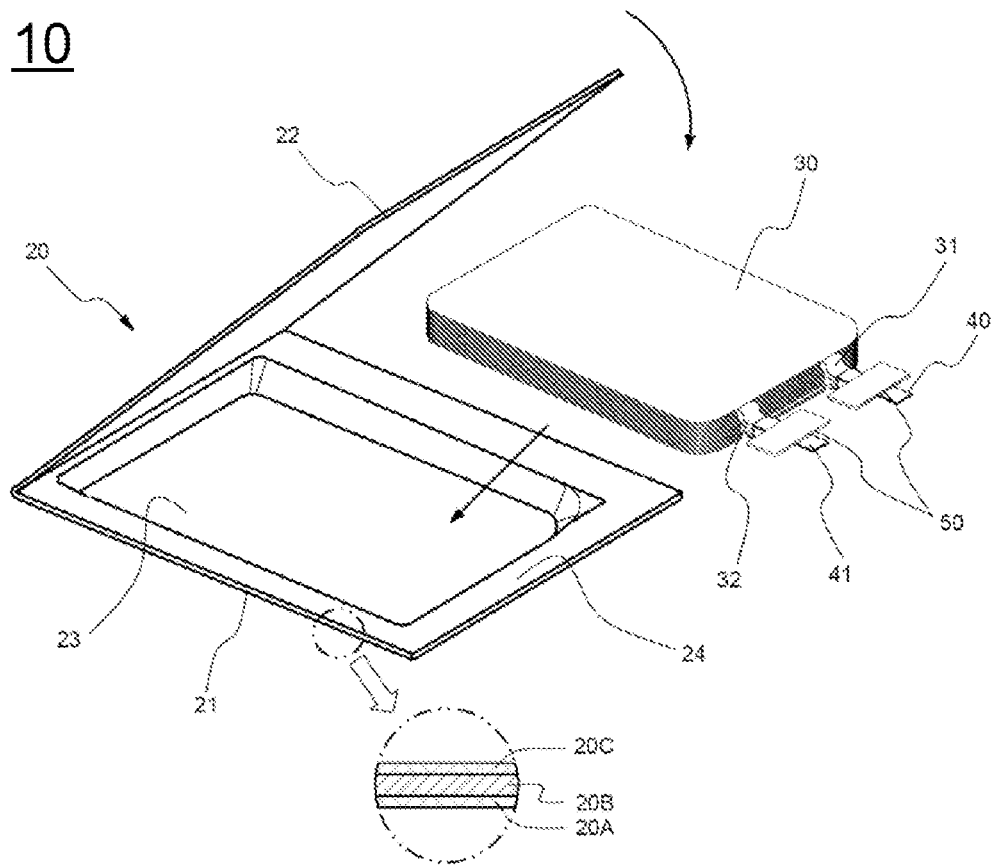

[FIG. 2]
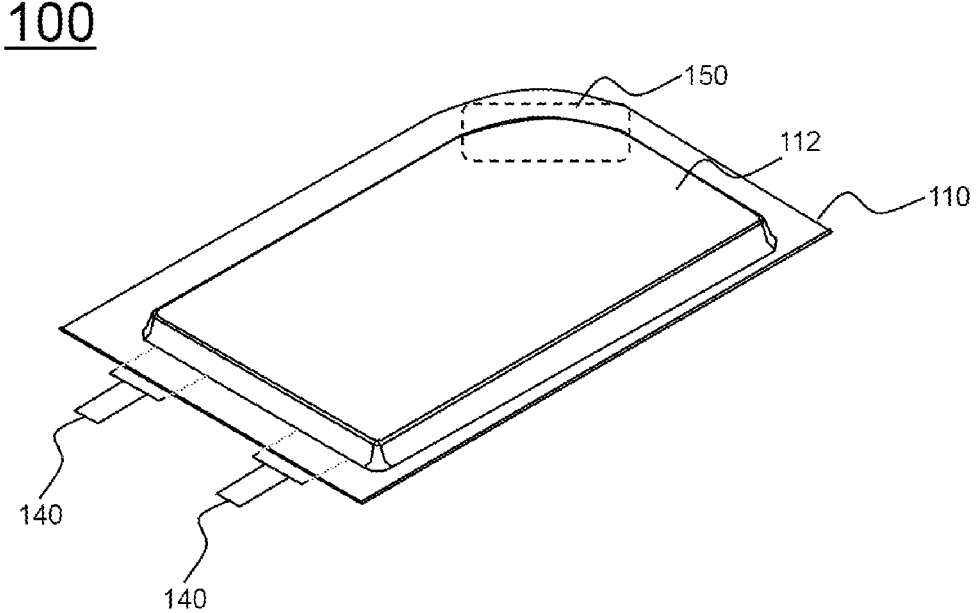

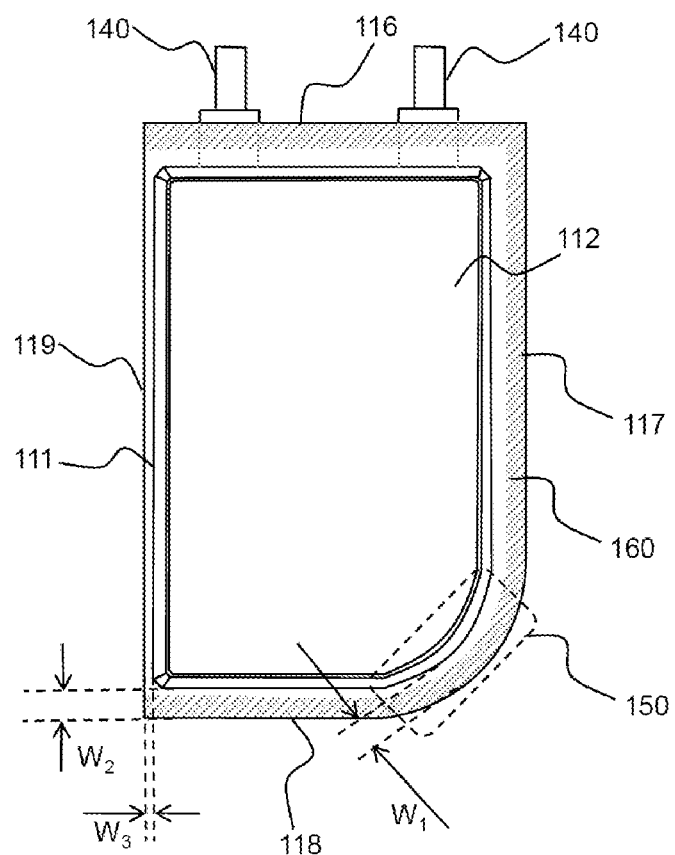
[FIG. 3]

【FIG. 4】
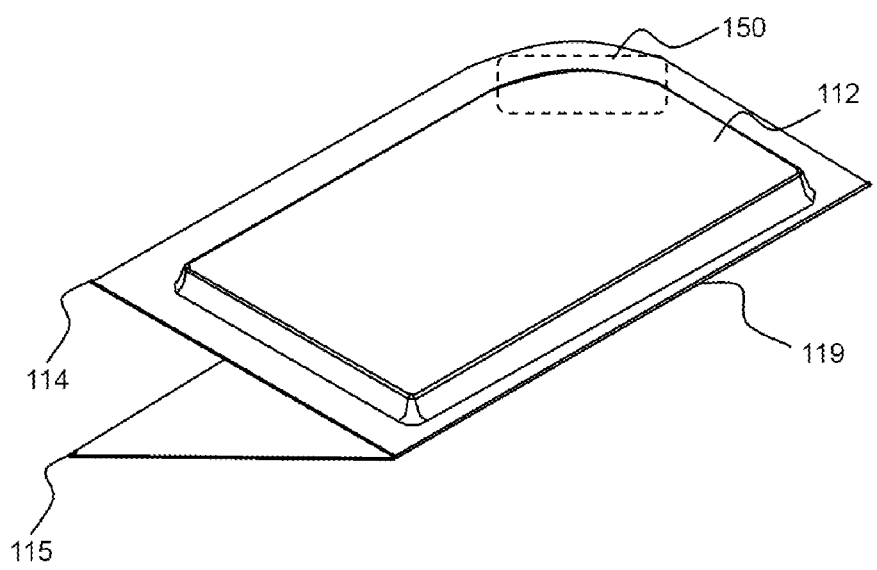

【FIG. 5】
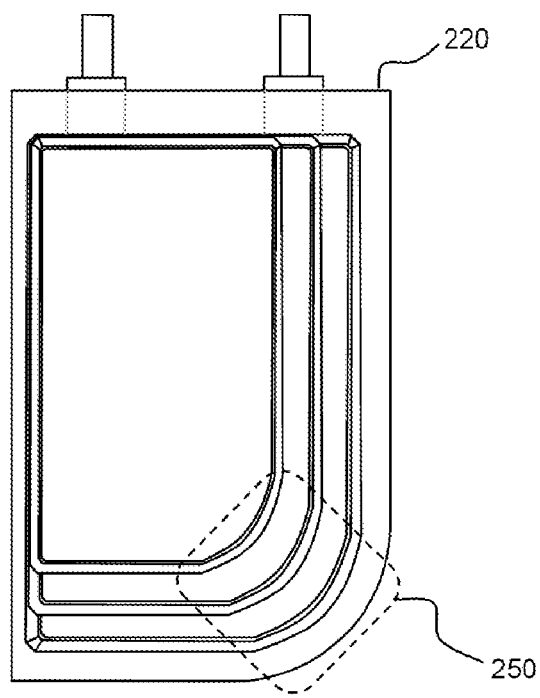
【FIG. 6】
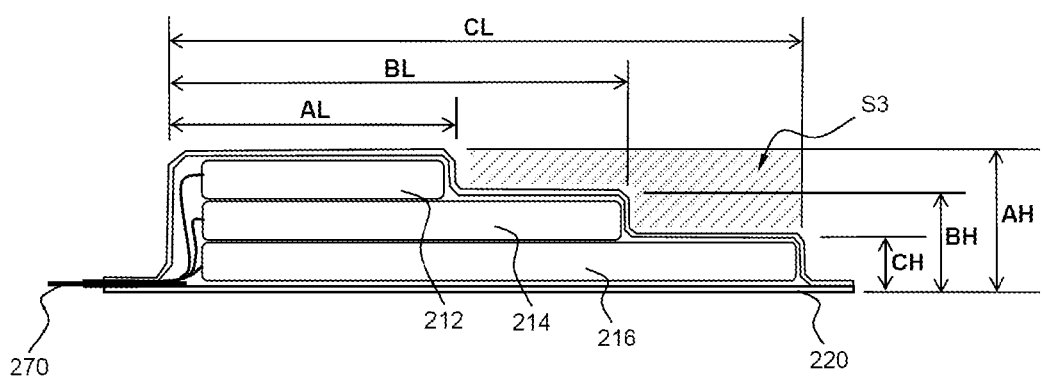

[FIG. 7]
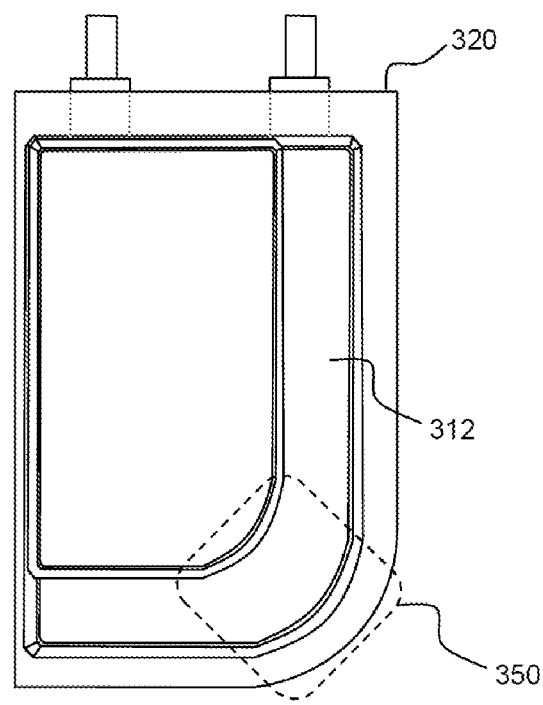
[FIG. 8]
[FIG. 9]
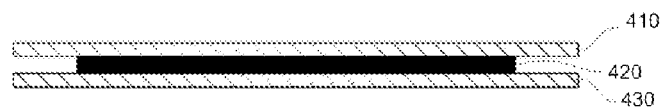

[FIG. 10]
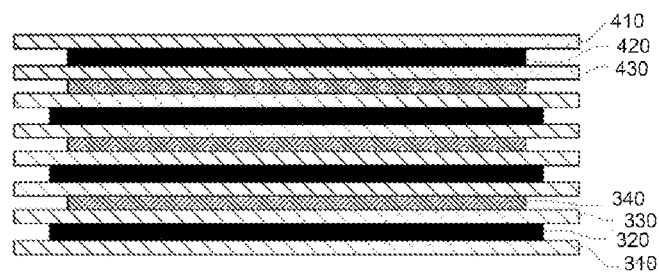
[FIG. 11]
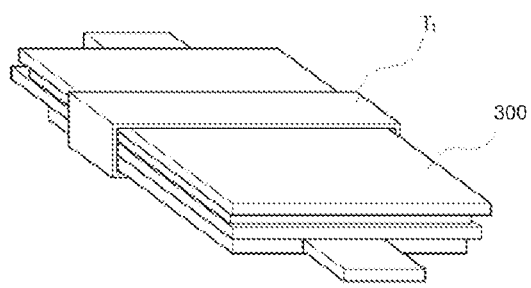
(a)
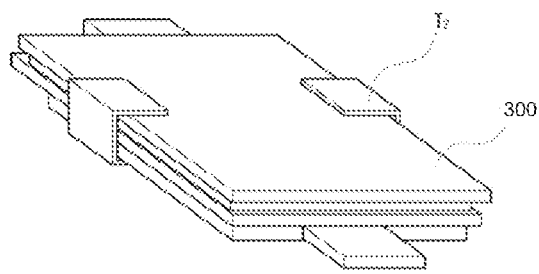

[FIG. 12]
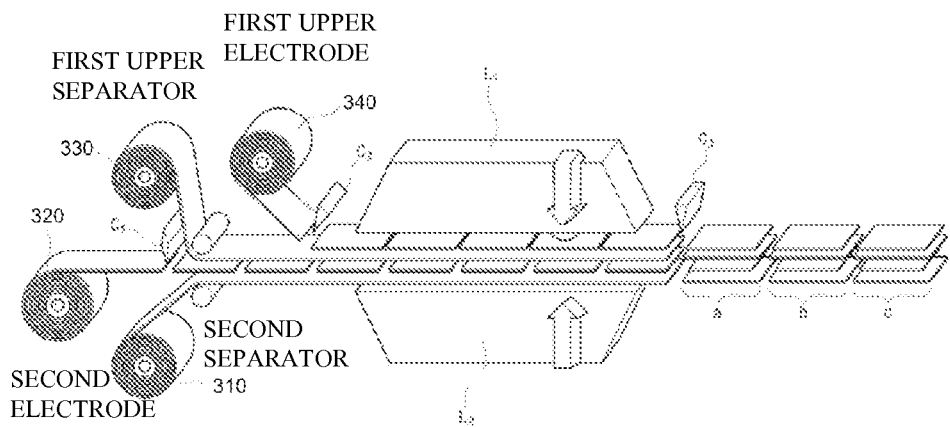

BATTERY CELL HAVING ROUND CORNER

TECHNICAL FIELD

The present invention relates to a battery cell configured to have a structure in which an electrode assembly, including positive electrodes, negative electrodes, and separators disposed respectively between the positive electrodes and the negative electrodes, is mounted in a battery case made of a laminate sheet including a resin layer and a metal layer, wherein the battery case is made of a one-unit member, which is bent to form an upper case and a lower case, at least one of the upper and lower cases is provided with a receiving part, in which the electrode assembly is mounted, the receiving part having a round corner formed at at least one side edge thereof, and sealed portions, which are formed at the upper case and the lower case by thermal welding, are located at an upper side of the battery case at which at least one electrode terminal is located, a first lateral side of the battery case adjacent to the upper side, and a lower side of the battery case opposite to the upper side, and a second lateral side of the battery case adjacent to the upper side is formed by a bent structure of the battery case.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be generally classified as a cylindrical battery, a prismatic battery, or a pouch-shaped battery. Based on the type of an electrolyte, a lithium secondary battery may also be classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case may be configured to have a jelly-roll (wound) type structure, a stacked type structure, or a combination (stacked/folded) type structure.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including positive electrodes, negative electrodes, and separators disposed respectively between the positive electrodes and the negative electrodes, each separator being coated with a solid electrolyte, is mounted in a pouch-shaped battery case 20 in a sealed state such that two electrode leads 40 and 41 electrically connected to positive electrode and negative electrode tabs 31 and 32 of the electrode assembly 30 are exposed outward.

The battery case 20 includes a case body 21 having a depressed receiving part 23, in which the electrode assembly 30 is located, and a cover 22 integrally connected to the case body 21.

The battery case 20 is made of a laminate sheet including an outer resin layer 20A constituting the outermost layer of the laminate sheet, an isolation metal layer 20B for preventing penetration of materials, and an inner resin layer 20C for sealing.

The positive electrode tabs 31 and the negative electrode tabs 32 of the stacked type electrode assembly 30 are respectively coupled to the electrode leads 40 and 41 by welding. In addition, insulative films 50 are attached to the top and bottom of each of the electrode leads 40 and 41 in order to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, a new type of battery cell has been required in accordance with a trend change for a slim type design or various other designs.

In addition, the above-mentioned battery cells may be configured to include electrode assemblies having the same size or the same capacity. For this reason, in order to manufacture a battery cell having a new structure in consideration of the design of a device, to which the battery cell is applied, it may be necessary to reduce the capacity of the battery cell or modify the design of the device such that the size of the device is increased.

Furthermore, electrical connection may be complicated during modification of the design of the device with the result that it may be difficult to manufacture a battery cell satisfying desired conditions.

Besides, it is necessary to manufacture the battery case based on the shape of the electrode assembly.

Therefore, there is a high necessity for an electrode assembly and a battery case applicable depending upon the shape of a device, to which a battery cell is applied, and a battery cell including the same.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various spaces of a device, whereby it is possible to maximally utilize an internal space of the device, and the battery cell can be efficiently mounted in various external structures of the device in addition to a rectangular external structure of the device.

Technical Solution

In accordance with one aspect of the present invention, the above and other objects can be accomplished by the provision of a battery cell configured to have a structure in which an electrode assembly, including positive electrodes, negative electrodes, and separators disposed respectively between the positive electrodes and the negative electrodes, is mounted in a battery case made of a laminate sheet including a resin layer and a metal layer, wherein the battery case is made of a one-unit member, which is bent to form an upper case and a lower case, at least one of the upper and lower cases is provided with a receiving part, in which the electrode assembly is mounted, the receiving part having a round corner formed at at least one side edge thereof, and sealed portions, which are formed at the upper case and the lower case by thermal welding, are located at an upper side of the battery case at which at least one electrode terminal is located, a first lateral side of the battery case adjacent to the upper side, and a lower side of the battery case opposite to the upper side, and a second lateral side of the battery case adjacent to the upper side is formed by a bent structure of the battery case.

In the battery cell according to the present invention, the round corner is formed at the receiving part, in which the electrode assembly is mounted. Consequently, it is possible for the battery cell to more accurately correspond to the shape, including a curved shape, of a device in which the battery cell is mounted and thus to further miniaturize the device.

The battery cell according to the present invention may be configured to have a structure in which the one-unit battery case is bent to form the upper case and the lower case, the electrode assembly is mounted in the receiving part formed at at least one of the upper and lower cases, the upper case covers the lower case, and the outer edge of the receiving part is sealed, thereby achieving sealing of the battery case.

The positive electrodes and the negative electrodes of the electrode assembly may be connected to the electrode terminals protruding outward from the battery case, and the second lateral side of the battery case adjacent to the upper side of the battery case, from which the electrode terminals protrudes, may be bent such that the upper case covers the lower case. The upper side, the lower side, and the first lateral side of the battery case may be sealed by thermal welding. The number and position of round corners formed at the edges of the receiving part are not particularly restricted.

For example, the round corner may be formed at at least one edge which does not abut on the upper side of the battery case. Specifically, the round corner may be formed at an edge between the lower side and the first lateral side of the battery case or at an edge between the lower side and the second lateral side of the battery case.

In addition, the round corner may be formed at an edge of the first lateral side of the battery case. That is, the round corner may be formed at an edge between the first lateral side and the upper side of the battery case and/or at an edge between the first lateral side and the lower side of the battery case. At this time, the round corner may be formed at the other sides of the battery case excluding the side at which the battery case is bent and folded.

In a concrete example, the round corner may have a maximum radius of curvature equivalent to 50% the length of the receiving part. The length of the receiving part may be the length of one side of the receiving part in a direction in which electrode leads protrude from the battery case or the length of one side of the receiving part in a direction perpendicular to the direction in which the electrode leads protrude from the battery case. More specifically, the length of one side of the receiving part in the direction in which the electrode leads protrude from the battery case may be shorter than that of one side of the receiving part in the direction perpendicular to the direction in which the electrode leads protrude from the battery case. At this time, the round corner may have a maximum radius of curvature equivalent to 50% the length of a long side of the receiving part. Specifically, the round corner may have a radius of curvature equivalent to 5 to 45% the length of the long side of the receiving part.

In addition, a thermally welded side of the battery case corresponding to a portion at which the round corner of the receiving part is formed may have a round corner. At this time, the thermally welded side at which the round corner is formed may have the same width as the other thermally welded sides at which no round corner is formed. That is, the thermally welded sides may have the same width such that gas is prevented from leaking from the battery cell through the portion at which the round corner is formed when the internal pressure of the battery cell increases.

Positive electrode tabs and negative electrode tabs may protrude from one side of the electrode assembly, or the positive electrode tabs may protrude from one side of the electrode assembly and the negative electrode tabs may protrude from the opposite side of the electrode assembly. Correspondingly, a positive electrode terminal and a negative electrode terminal may protrude from the upper side of the battery case, or the positive electrode terminal may protrude from the upper side of the battery case and the negative electrode terminal may protrude from the lower side of the battery case.

In addition, in order to maximally use the internal space of the receiving part of the battery case and thus to further increase the capacity of the battery cell, the electrode assembly may have an external shape corresponding to an internal shape of the receiving part.

In a concrete example, the electrode assembly may include two or more unit cells, each of the unit cells being configured to have a structure in which electrode tabs protrude from electrode plates.

For example, the unit cells may be stacked in a vertical direction on the basis of a plane, and at least two of the unit cells may have different planar sizes.

Each of the unit cells may be configured to have a structure in which round corners are formed at one or more edges. In addition, the edges of the unit cells at which the round corners are formed may be located in the same direction.

The stacked structure of the unit cells is not particularly restricted. For example, the unit cells may be stacked such that sizes of the unit cells are gradually decreased from the bottom to the top of the electrode assembly to form a stair-shaped step. As compared with a conventional structure in which battery cells having different sizes are stacked, therefore, it is possible to minimize a dead space of the battery cell, thereby increasing a ratio of capacity to size of the battery cell, which is very preferable.

Each of the unit cells of the electrode assembly is not particularly restricted so long as each of the unit cells constitutes a positive electrode and a negative electrode. For example, each of the unit cells may be configured to have a stacked type structure or a stacked/folded type structure. The details of the stacked/folded type electrode assembly are disclosed in Korean Patent Application Publication No. 2001-0082058, No. 2001-0082059, and No. 2001-0082060, which have been filed in the name of the applicant of the present patent application. The disclosures of the applications are incorporated herein by reference.

An electrode assembly including a plurality of unit cells stacked in a vertical direction on the basis of a plane, at least two of the unit cells having different planar sizes, i.e. a stacked type electrode assembly may include a first unit cell configured to have a structure in which a positive electrode, a negative electrode, and separators are laminated while being stacked such that the positive electrode or the negative electrode is disposed between the separators. At this time, one of the separators may be a second separator.

In addition, the stacked type electrode assembly may include a second unit cell configured to have a structure in which a positive electrode or a negative electrode and separators are laminated while being stacked such that the positive electrode or the negative electrode is disposed between the separators. At this time, one of the separators may be a second separator.

For example, the first unit cell may be configured to have a structure in which a positive electrode, a separator, a negative electrode, and a separator are laminated while being sequentially stacked or a structure in which a negative electrode, a separator, a positive electrode, and a separator are laminated while being sequentially stacked.

The stacked type electrode assembly may include a third unit cell configured to have a structure in which a positive electrode, a negative electrode, and a separator are laminated while being stacked such that the separator is disposed between the positive electrode and the negative electrode.

The stacked type electrode assembly may include a fourth unit cell configured to have a structure in which a positive electrode or a negative electrode and a separator are laminated while being stacked.

The stacked type electrode assembly may include any one selected from among the first unit cell, the second unit cell, the third unit cell, and the fourth unit cell or a combination thereof.

The second unit cell may be stacked at the uppermost end or the lowermost end of the first unit cell.

In a structure in which only the second unit cells are stacked, a positive electrode or a negative electrode may be disposed between the second unit cells.

A fixing member to more securely maintain the stack structure of the positive electrode, the separator, and the negative electrode may be added to the first unit cell to the fourth unit cell.

The fixing member may be an additional external member different from the first unit cell or the second unit cell. The fixing member may be an adhesive tape or a bonding tape to cover a portion or the entirety of the outside of each unit cell.

The outside of each unit cell may include sides, a top, a front, and a rear.

The fixing member may be a portion of the separator constituting each unit cell. In this case, the ends of the separator may be thermally welded to fix each unit cell. However, the present invention is not limited thereto.

The ends of the separator may extend such that the separator has a length greater than the size of the positive electrode and the negative electrode, i.e. the horizontal length or the vertical length. The extending ends of the separator may be connected to each other by thermal welding.

The fixing member may include all members that are capable of fixing the first unit cell or the second unit cell In a case in which the stacked type electrode assembly is configured to include the first unit cell and the second unit cell as described above, it is possible to improve productivity and yield as compared with a stacked type electrode assembly configured to have a structure in which a positive electrode, a negative electrode, and a separator are simply stacked.

In addition, the positive electrode, the separators, and the negative electrode are laminated on a per first unit cell basis, and therefore it is possible to minimize expansion in volume of the stacked type electrode assembly due to swelling.

In a case in which the stacked type electrode assembly is configured to include the first unit cell and the second unit cell, misalignment of the electrode assembly caused during a folding process is prevented and omission of processing equipment is possible. In addition, it is possible to form the first unit cell or the second unit cell using only one laminator. Furthermore, it is possible to manufacture the stacked type electrode assembly by simple stacking. Consequently, damage to electrodes caused during the folding process may be reduced, and electrolyte wettability may be improved. Moreover, a single-sided organic and inorganic composite separator, e.g. a safety reinforced separator (SRS), may be used as the separator exposed to the outside. Consequently, cell thickness may be decreased and, at the same time, processing cost may be reduced.

The receiving part of the battery case may be configured to have a structure including a stair-shaped step corresponding to an external shape of the electrode assembly.

According to the present invention, therefore, it is possible to manufacture battery cells having various capacities and sizes based on the above-described specific structure. In a case in which a device, in which the battery cell is mounted, is manufactured, the battery cell can be mounted in various spaces of the device, whereby it is possible to maximally utilize an internal space of the device.

The battery cell may be a lithium ion battery cell or a lithium ion polymer battery cell. However, the present invention is not limited thereto.

In accordance with another aspect of the present invention, there is provided a device including the battery cell with the above-stated construction as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

In accordance with a further aspect of the present invention, there is provided a battery pack including two or more battery cells with the above-stated construction as unit cells. That is, there is provided a battery pack configured to have a structure in which two or more battery cells as unit cells are connected in series and/or parallel to each other. The battery pack may be used in a device, such as a mobile phone, a portable computer, a smart phone, a tablet PC, a smart pad, a netbook computer, a light electronic vehicle (LEV), an electric vehicle, a hybrid electric vehicle, a plug-in hybrid electric vehicle, or a power storage device.

The structure of the device and a method of manufacturing the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a conventional battery cell;

FIG. 2 is a perspective view showing a battery cell according to an embodiment of the present invention;

FIG. 3 is a plan view showing the battery cell of FIG. 2;

FIG. 4 is a perspective view showing a battery case of the battery cell of FIG. 3;

FIG. 5 is a plan view showing a battery cell according to another embodiment of the present invention;

FIG. 6 is a vertical sectional view showing the battery cell of FIG. 5;

FIG. 7 is a plan view showing a battery cell according to a further embodiment of the present invention;

FIG. 8 is a view showing the structure of a first unit cell according to an embodiment of the present invention;

FIG. 9 is a view showing the structure of a second unit cell according to an embodiment of the present invention;

FIG. 10 is a typical view showing a stacked type electrode assembly according to an embodiment of the present invention;

FIG. 11 is a typical view showing a fixing structure of the first unit cell of FIG. 8; and FIG. 12 is a view showing a process of manufacturing a first unit cell according to an embodiment of the present invention

BEST MODE

Now, exemplary embodiments of the present invention will be described in detail with reference to the accompanying drawings. It should be noted, however, that the scope of the present invention is not limited by the illustrated embodiments.

FIG. 2 is a perspective view showing a battery cell according to an embodiment of the present invention, FIG. 3 is a plan view showing the battery cell of FIG. 2, and FIG. 4 is a perspective view showing a battery case of the battery cell of FIG. 3.

Referring to these figures, a battery cell 100 is configured to have a structure including a battery case having a receiving part 112 provided with a round corner 150 and an electrode assembly (not shown) mounted in the receiving part 112.

The battery case 110 includes an upper case 114 and a lower case 115 which are formed by bending a one-unit member. The receiving part 112 is formed at the upper case 114. The receiving part 112 is configured to have a depressed shape. The round corner is provided at one edge of the receiving part 112.

The battery case 110 has sides 116, 117, 118, and 119. Sealed portions 160, which are formed at the upper case 114 and the lower case 115 by thermal welding, are located at the upper side 116 at which electrode terminals 140 are located, the first lateral side 117 adjacent to the upper side 116, and the lower side opposite to the upper side 116. The second lateral side 119 adjacent to the upper side 116 is formed by a bent structure of the battery case 110.

That is, the second lateral side 119 adjacent to the upper side 116, from which the electrode terminals 140 protrude is bent such that the upper case 114 covers the lower case 115, and the upper side 116, the lower side 118, and the first lateral side 117 are sealed by thermal welding.

The round corner 150 is formed at an edge between the first lateral side 117 and the lower side 118. Although not shown, another round corner may also be formed at an edge between the first lateral side 117 and the upper side 116. That is, round corners may be formed at the edge between the first lateral side 117 and the upper side 116 and at the edge between the first lateral side 117 and the lower side 118.

In addition, a thermally welded side located at a portion at which the round corner 150 is formed has a round corner corresponding to the shape of the round corner 150 of the receiving part 110. A width W1 of the side at which the round corner is formed is equal to a width W2 of the thermally welded sides at which no round corner is formed.

Meanwhile, the second side 119 is bent to form the upper case 114 and the lower case 115. A width W3 between a lateral side 111 of the receiving part 112 located in the bent direction and the second lateral side 119 is less than the width W1 of the side at which the round corner is formed and the width W2 of the thermally welded side at which no round corner is formed. A portion between the lateral side 111 of the receiving part 112 and the second lateral side 119 is not sealed. Consequently, the width W3 may be relatively small, or the width W3 may be 0 such that the lateral side of the receiving part is directly located at the bent portion.

On the other hand, in a case in which the bent structure of the battery case 20 is formed at the side opposite to the side from which the electrode leads 40 and 41 protrude in the same manner as in the pouch-shaped secondary battery 10 of FIG. 1, and the round corner is formed such that the portion having the bent structure is included in the round corner, it is difficult to secure uniformity in sealing force of the round corner portion. That is, in a case in which internal pressure is increased in an abnormal situation, sealing of a portion having relatively low sealing force may be released due to a nonuniform sealed state.

As shown in FIGS. 2 and 3, therefore, the battery case is configured to have a structure in which the portion having the round corner 150 and the side 119 having the bent structure are not adjacent to each other or do not overlap each other, whereby the sealed portion of the round corner 150 has uniform sealing force.

That is, the second lateral side 119 adjacent to the upper side 116 is formed by the bent structure of the battery case 110, and the round corner 150 is formed at the edge between the first lateral side 117 and the lower side 118.

The electrode assembly may be provided with a round corner having a structure corresponding to the shape of the receiving part 110 having the round corner 150 such that the internal space of the receiving part can be maximally used.

FIG. 5 is a plan view showing a battery cell according to another embodiment of the present invention, and FIG. 6 is a vertical sectional view showing the battery cell of FIG. 5.

Referring to FIGS. 5 and 6, a battery cell 200 is configured to have a structure in which unit cells 212, 214, and 216 having different lengths AL, BL, and CL and capacities are mounted in a battery case 220 in a state in which the unit cells are vertically stacked. In addition, the vertically stacked type battery cell is configured to have a structure in which the thickness of the battery cell is gradually increased toward an electrode terminal 270 protruding outward from the battery case 220.

A receiving part is configured to have a stepped structure for receiving the unit cells 212, 214, and 216. Round corners 250 are formed at one side of the receiving part. The round corners 250 are formed at edges of the receiving part in the same direction.

The unit cells 212, 214, and 216 are stacked such that the planar sizes of the unit cells are gradually decreased from bottom to top, and the round corners 250 formed at the unit cells 212, 214, and 216 have different radii of curvature. That is, the radii of curvature of the unit cells are also gradually decreased from bottom to top.

Meanwhile, the capacities of the unit cells 212, 214, and 216 are proportional to products of the lengths AL, BL, and CL, heights AH-BH, BH—CH, and CH, and widths (not shown) of the respective unit cells 212, 214, and 216.

In the above-described unique structure of the battery cell 200, a free space S3 is provided at the upper end of the right side of the battery cell due to the unit cells 212, 214, and 216 having different lengths AL, BL, and CL. The space is inversely proportional to the lengths, the heights, and the widths of the unit cells 212, 214, and 216.

The space is provided to cope with a condition, such as an irregular internal space of a device, to which the battery cell is applied, or interference with other parts of the device. The direction in which the thickness of the battery cell is increased and the increase in stack thickness of the battery cell may be flexibly changed in design based on a situation applied to the battery cell.

FIG. 7 is a plan view showing a battery cell according to a further embodiment of the present invention. As described above, the battery cell of FIG. 5 is configured such that three kinds of unit cells having different planar sizes are stacked, and therefore the receiving part is formed to have a three-step structure. As shown in FIG. 7, on the other hand, a battery cell 300 is configured such that two kinds of unit cells having different planar sizes are stacked, and therefore a receiving part 312 is formed to have a two-step structure. In addition, round corners 350 having different radii of curvature are formed at the respective steps of the receiving part 312 in one edge direction.

That is, the unit cells having different planar sizes may be stacked to provide a structure having various other numbers of steps in addition to the three steps or the two steps as needed.

As shown in FIG. 8, a first unit cell is configured to have a structure in which a separator 310, a positive electrode 320, a separator 330, and a negative electrode 340 are laminated while being sequentially stacked.

As shown in FIG. 9, a second unit cell is configured to have a structure in which a separator 410, a positive electrode 420, and a separator 430 are laminated while being sequentially stacked.

FIG. 10 shows a stacked type electrode assembly configured to have a structure in which the second unit cell of FIG. 9 is stacked on the uppermost end of a first unit cell stack constituted by first unit cells, one of which is shown in FIG. 8.

FIG. 11 shows an embodiment in which a fixing member $T_1$ is added to the first unit cell of FIG. 8. Specifically, the fixing member $T_1$ is added to the side or the front of the first unit cell 300.

In order to secure stack stability of a simple stack structure, an additional fixing member may be added to the side of the stack structure to fix the stack structure. The fixing member may be realized as a tape $T_1$ surrounding the entire surface of the first unit cell 300 as shown in FIG. 11(a). Alternatively, the fixing member may be realized as a fixing member $T_2$ to fix only each side of the first unit cell 300 as shown in FIG. 11(b).

FIG. 12 is a view typically showing a process of manufacturing the first unit cell according to the present invention.

As shown in FIG. 12, materials for a separator 310, a positive electrode 320, a separator 330, and a negative electrode 340 are simultaneously loaded (using sheet type loading units). The material for the positive electrode 320, which is used as a middle layer, is cut into a designed size, and is then loaded into laminators $L_1$ and $L_2$. Subsequently, the materials for the separators 310 and 330, which are disposed under and above the material for the positive electrode 320, are simultaneously loaded into the laminators $L_1$ and $L_2$. At the same time, the material for the negative electrode 340 is loaded into the laminators $L_1$ and $L_2$.

Subsequently, the laminators $L_1$ and $L_2$ form a structural body in which the two electrodes and the two separators are laminated to each other using heat and pressure, i.e. a first unit cell. Subsequently, a cutter $C_3$ cuts the structural body into a plurality of first unit cells. Afterwards, various inspection processes, such as a thickness inspection (a), a vision inspection (b), and a short circuit inspection (c), may be further performed with respect to each first unit cell.

Subsequently, each first unit cell manufactured as described above is fixed using a fixing member, and the first unit cells are stacked to constitute a structural body in which the first unit cells are stacked. Subsequently, the second unit cell shown in FIG. 10 is stacked on the structural body and then the second unit cell and the structural body are fixed using a fixing member to complete a stacked type electrode assembly.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode assembly according to the present invention is formed by stacking unit cells having different sizes and includes a round corner having a curved structure. Consequently, it is possible for a battery cell including the electrode assembly to more accurately correspond to the shape, including a curved shape, of a device in which the battery cell is mounted and thus to further miniaturize the device.

In addition, the battery cell is configured to have a structure to improve sealability of an edge portion at which the round corner is formed. Consequently, it is possible to secure safety of the battery cell.

The invention claimed is:
1. A battery cell comprising:
an electrode assembly, the electrode assembly comprising:
positive electrodes, negative electrodes, and separators disposed respectively between the positive electrodes and the negative electrodes, the electrode assembly being mounted in a battery case made of a laminate sheet comprising a resin layer and a metal layer,
wherein the battery case is made of a one-unit member, which is bent to form an upper case and a lower case,
wherein at least one of the upper and lower cases is provided with a receiving part, in which the electrode assembly is mounted, the receiving part having a round corner formed at at least one side edge thereof,
wherein sealed portions, which are formed at the upper case and the lower case by thermal welding, are located at an upper side of the battery case at which at least one electrode terminal is located, a first lateral side of the battery case adjacent to the upper side,
wherein a lower side of the battery case opposite to the upper side, and a second lateral side of the battery case adjacent to the upper side is formed by a fold line joining the upper case to the lower case,
wherein the round corner is formed at an edge of the first lateral side of the battery case, and wherein the round corner has a maximum radius of curvature equivalent to 50% a length of a long side of the receiving part.

2. The battery cell according to claim 1, wherein the battery case is bent at the second lateral side such that the upper case and the lower case are thermally welded to each other in tight contact at the other sides of the battery case.

3. The battery cell according to claim 1, wherein the round corner is formed at at least one edge which does not abut on the upper side of the battery case.

4. The battery cell according to claim 1, wherein the round corner has a radius of curvature equivalent to 5 to 45% the length of the long side of the receiving part.

5. The battery cell according to claim 1, wherein a thermally welded side of the battery case corresponding to a portion at which the round corner of the receiving part is formed has a round corner.

6. The battery cell according to claim 1, wherein a positive electrode terminal and a negative electrode terminal protrude from the upper side of the battery case, or the positive electrode terminal protrudes from the upper side of the battery case and the negative electrode terminal protrudes from the lower side of the battery case.

7. The battery cell according to claim 1, wherein the electrode assembly has an external shape corresponding to an internal shape of the receiving part.

8. The battery cell according to claim 1, wherein the battery cell is a lithium ion battery cell or a lithium ion polymer battery cell.

9. A battery pack comprising two or more battery cells according to claim 1 as unit cells.

10. A battery cell comprising:
an electrode assembly, the electrode assembly comprising:
positive electrodes, negative electrodes, and separators disposed respectively between the positive electrodes and the negative electrodes, the electrode assembly being mounted in a battery case made of a laminate sheet comprising a resin layer and a metal layer,
wherein the battery case is made of a one-unit member, which is bent to form an upper case and a lower case,
wherein at least one of the upper and lower cases is provided with a receiving part, in which the electrode assembly is mounted, the receiving part having a round corner formed at at least one side edge thereof,
wherein sealed portions, which are formed at the upper case and the lower case by thermal welding, are located at an upper side of the battery case at which at least one electrode terminal is located, a first lateral side of the battery case adjacent to the upper side,
wherein a lower side of the battery case opposite to the upper side, and a second lateral side of the battery case adjacent to the upper side is formed by a fold line joining the upper case to the lower case,
wherein the round corner is formed at an edge of the first lateral side of the battery case,
wherein a thermally welded side of the battery case corresponding to a portion at which the round corner of the receiving part is formed has a round corner, and
wherein the round corner of the thermally welded side has the same width as the lower side, the remaining corners not being rounded.

11. A battery pack comprising two or more battery cells according to claim 10 as unit cells.

12. A battery cell comprising:
an electrode assembly, the electrode assembly comprising:
positive electrodes, negative electrodes, and separators disposed respectively between the positive electrodes and the negative electrodes, the electrode assembly being mounted in a battery case made of a laminate sheet comprising a resin layer and a metal layer,
wherein the battery case is made of a one-unit member, which is bent to form an upper case and a lower case,
wherein at least one of the upper and lower cases is provided with a receiving part, in which the electrode assembly is mounted, the receiving part having a round corner formed at at least one side edge thereof,
wherein sealed portions, which are formed at the upper case and the lower case by thermal welding, are located at an upper side of the battery case at which at least one electrode terminal is located, a first lateral side of the battery case adjacent to the upper side,
wherein a lower side of the battery case opposite to the upper side, and a second lateral side of the batter case adjacent to the upper side is formed by a fold line joining the upper case to the lower case, and
wherein the round corner is formed at an edge of the first lateral side of the battery case,
wherein the electrode assembly comprises two or more unit cells, each of the unit cells being configured to have a structure in which electrode tabs protrude from electrode plates, and a round corner is formed at at least one edge,
wherein the unit cells are stacked such that sizes of the unit cells are gradually decreased from a bottom to a top of the electrode assembly to form a stair-shaped step,
wherein the unit cells are stacked such that radii of curvature of the round corners are gradually decreased from the bottom to the top of the electrode assembly, and
wherein the receiving part of the battery case is provided with a stair-shaped step corresponding to an external shape of the electrode assembly.

13. The battery cell according to claim 12, wherein the unit cells are stacked in a vertical direction on the basis of a plane, and at least two of the unit cells have different planar sizes.

14. The battery cell according to claim 12, wherein edges of the unit cells at which the round corners are formed are located in the same direction.

15. The battery cell according to claim 12, wherein each of the unit cells of the electrode assembly is configured to have a stacked type structure or a stacked/folded type structure.

16. The battery cell according to claim 15, wherein each of the unit cells is a stacked type unit cell comprising a positive electrode, a negative electrode, a first plate-shaped separator disposed between the positive electrode and the negative electrode, the positive electrode and the negative electrode being stacked in a vertical direction on the basis of a plane in a state in which the separator is disposed between the positive electrode and the negative electrode.

17. The battery cell according to claim 16, wherein the stacked type unit cell comprises a first unit cell configured to have a structure in which a positive electrode, a negative electrode, and separators are laminated while being stacked such that any one of the positive electrode and the negative electrode is located an outermost side of the unit cell, and the outermost positive electrode or the outermost negative electrode is disposed between the separators.

18. The battery cell according to claim 16, wherein the stacked type unit cell comprises a second unit cell configured to have a structure in which a positive electrode, a negative electrode, and separators are laminated while being stacked such that the separators are located at outermost sides of the unit cell, and any one of the positive electrode and the negative electrode is disposed between the separators.

19. A battery pack comprising two or more battery cells according to claim 12 as unit cells.

* * * * *